United States Patent
Naivar

[11] Patent Number: 5,992,305
[45] Date of Patent: Nov. 30, 1999

[54] DIAMOND-SHAPED CHARMARKER

[76] Inventor: Keith Naivar, 8213 N. 128th E. Ave., Owasso, Okla. 74055

[21] Appl. No.: 09/247,161

[22] Filed: Feb. 9, 1999

[51] Int. Cl.⁶ .............................. A47J 37/00; A47J 37/04; A47J 37/06
[52] U.S. Cl. .................................. 99/388; 99/355; 99/483
[58] Field of Search .................... 99/339, 349, 352–355, 99/386–388, 391–393, 400, 401, 423, 443 R, 443 C, 444–450, 483; 101/31, 40, 7, 36; 219/388; 425/92, 105, 215, 307; 426/383, 520, 523

[56] References Cited

U.S. PATENT DOCUMENTS

| | | | |
|---|---|---|---|
| 2,246,719 | 6/1941 | Burnham, Jr. | 99/483 X |
| 2,483,669 | 10/1949 | Reid | 99/388 X |
| 3,372,635 | 3/1968 | Meyer | 99/386 X |
| 3,721,178 | 3/1973 | Szabrak et al. | 99/401 X |
| 3,917,445 | 11/1975 | Suva et al. | 219/388 |
| 4,026,201 | 5/1977 | Fetzer | 99/355 |
| 4,089,260 | 5/1978 | Brown et al. | 99/388 |
| 4,297,942 | 11/1981 | Benson et al. | 99/386 |
| 4,373,431 | 2/1983 | Wallick et al. | 99/483 |
| 4,433,621 | 2/1984 | Van Wyk et al. | 101/40 X |
| 4,656,927 | 4/1987 | Mosby et al. | 99/402 |
| 5,033,365 | 7/1991 | Rao et al. | 99/349 |
| 5,044,264 | 9/1991 | Forney | 99/388 X |
| 5,162,119 | 11/1992 | Pappas et al. | 425/92 |

*Primary Examiner*—Timothy F. Simone
*Attorney, Agent, or Firm*—Molly D. McKay

[57] ABSTRACT

A charmarker for creating complex grid pattern of mark, such as a diamond-shaped gird pattern, on foods as the foods pass under the charmarker on a conveyer. The charmarker contains a rotating shaft on which heated char marking rings rotatably hang. Each of the rings is provided with parallel, spaced apart cross marking members located at the periphery of the ring. The shaft is provided with ridges and valleys that engage, in a gear fashion, teeth and grooves provided on an interior opening surface of each ring in order to keep the rings in synchronized rotation as they pass over the food. Synchronized rotation of the rings keeps the cross marking members on the rings aligned so that the desired grid pattern of mark appears on the food.

7 Claims, 4 Drawing Sheets

DIAMOND-SHAPED CHARMARKER

BACKGROUND OF THE INVENTION

1. Field of the Invention

The present invention relates to an improvement in char marking equipment used in cooking food on a continuously moving food product conveyor. More specifically, the present invention pertains to a unique combination of charmarker rings and a shaft that keeps the rings synchronized as they rotate over food that passes below the rings on the conveyor. Each char marking ring is provided with outwardly extending spaced apart rods that contact the food as the food passes under the rings, thus forming a grid pattern of marks on the food.

2. Description of the Related Art

U.S. Pat. No. 4,026,201 teaches a charmarker for marking meat patties with parallel charred dark stripes. To enable the invention taught in the 201' patent to operate, a cylindrical shaft is provided horizontally above a moving food conveyor and a plurality of heated char marking rings hang on the shaft so that there is a small space between the lowermost portion of the rings and the conveyor. When a meat patty is placed on the conveyer, the conveyer moves the patty beneath the shaft so that the heated rings encounter the patty. When the heated rings encounter the patty, the rings are forced to travel over the patty by the attachment of the rings to the shaft, thus creating parallel charred dark stripes on the meat patty as the rings roll over the patty.

The problem with this type of char marking is that the parallel dark stripes that are produced on the patty do not resemble the type of marking that a patty receives when it is cooked on a grill. Thus, esthetically, the parallel marking pattern is not as desirable as a grid pattern of marking, such as the type of marking that would have been created on the patties if they had actually been cooked on a grill.

Since the travel of the rings over the patties has, until now, not been synchronized, it was impossible to create a grid pattern of marking on patties by employing independently moving char marking rings. Obviously, the rings could be modified so that they would create a grid pattern on patties if their travel over the patties could be synchronized in a way that kept cross marking members provided on adjacent rings properly aligned with each other. If cross marking members were provided on the rings of the 201' patent, a regular cross marking pattern would not be created, but rather the cross marking would be irregular and disorganized. This disorganized result would result because each ring would have traveled over the patties independent of the travel of adjacent rings.

The present invention addresses this problem by providing a shaft that maintains the rings in synchronized travel. The shaft of the present invention is provided with ridges that engage teeth that are provided on the rings in order to keep the rings synchronized as they pass over patties. In addition, cross marking members are provided on each of the rings in order to create a grid pattern on the patties as they pass under the rings.

One of the advantages of the present invention is that it allows food to be marked with a diamond-shaped grill mark or any other custom designed grill mark on cooked or ready to cook food products to simulate an open flame cooking process. The improvement over the prior art char marking equipment is the ability to produce complex grill mark patterns using multiple independent floating rings that conform to the contour of the food product while the rings remain synchronized.

SUMMARY OF THE INVENTION

The present invention is an improved charmarker for use in marking food with a grid pattern marking as the food is cooked on a conveyor. The charmarker consists of a special shaft and special char marking rings.

The shaft is a long, generally cylindrical member, provided with opposite ends. The ends of the shaft are supported in the charmarker in order to hold the shaft horizontally above a food conveyor. The shaft is rotated by motorized means that attaches to one end of the shaft so that the shaft rotates in conjunction with linear movement of the conveyor.

The external surface of the shaft is provided with outwardly extending, longitudinally oriented pointed ridges. Each of the ridges extends between the two ends of the shaft along the entire length of the shaft. A "V"-shaped valley is provided between each adjacent pointed ridge. When the shaft is viewed in cross section, the shaft is seen to be generally circular, but is provided with a plurality of evenly spaced apart pointed ridges extending outward therefrom, with a "V"-shaped valley between each adjacent pair of ridges.

The char marking rings of the present charmarker differ from prior art char marking rings in two significant ways. First, the char marking rings of the present invention are provided with an interior opening surface that contains spaced-apart, inwardly oriented pointed teeth and "V"-shaped grooves separating adjacent teeth. The purpose of the teeth is to engage the "V"-shaped valleys of the rotating shaft and thereby keep all of the rings synchronized in their rotation.

Second, each of the rings is provided with a plurality of spaced-apart, cross marking members that are located at the periphery of the ring and that extend outward on one side of the ring toward the periphery of the next adjacent ring. Each of the cross marking members is approximately parallel to each of the other cross marking members on the same ring. The cross marking members extend outward from the ring on one side of the ring and they serve two purposes. The first and primary purpose served by the cross marking members is to mark the food in a grid pattern as the food passes under the rings on the conveyor. The other purpose served by the cross marking members is incidental to the primary purpose. The second purpose of the cross marking members is to space the adjacent rings apart from each other, making in unnecessary to provide additional spacers on either the shaft or the rings.

Each cross marking member is associated with one of the teeth on the ring so that when the teeth of the rings engage a single "V"-shaped valley, as is the case when the rings are hanging on the shaft, the cross marking members of the rings are aligned so that a regular grid pattern will be created on any food that passes under the rings. The ridges provided on the shaft and the teeth provided on the rings are of sufficient height and the "V"-shaped valleys and "V"-shaped grooves are of sufficient depth that the rings are not lifted off of the shaft a sufficient distance when the rings roll over patties in order to allow the uppermost tooth of the rings to pass over a ridge of the shaft and to enter a new valley. This forces the ring to rotate in conjunction with the rotation of the shaft. The shaft rotation speed is coordinated with the movement of the conveyer. The shaft is rotated at a speed so that the peripheries of the rings travel at approximately the same speed as the linear travel of the conveyor. This allows the rings to rotate over the patties at the same speed that the conveyer moves the food under the rings.

DETAILED DESCRIPTION OF THE PREFERRED EMBODIMENT

INVENTION

Figure 1:
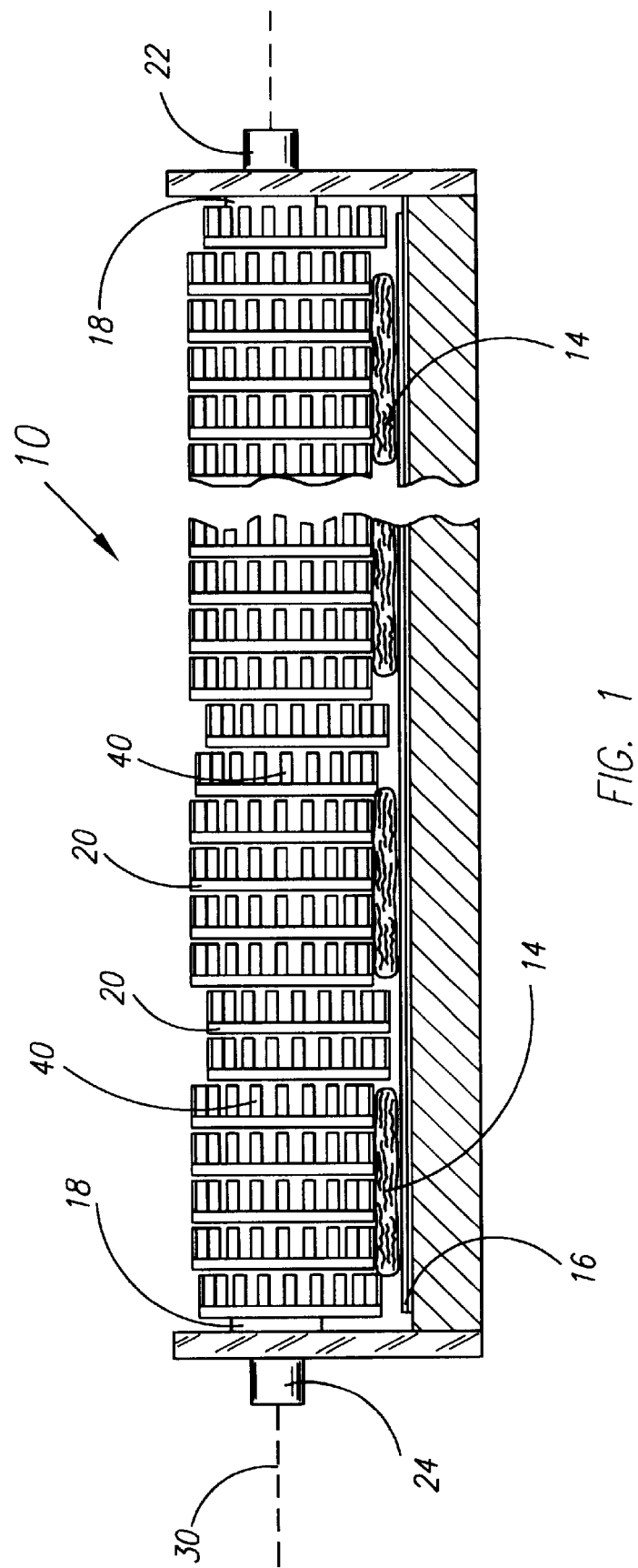
FIG. 1 is a front elevation of a charmarker constructed in accordance with a preferred embodiment of the present invention.
Figure 2:
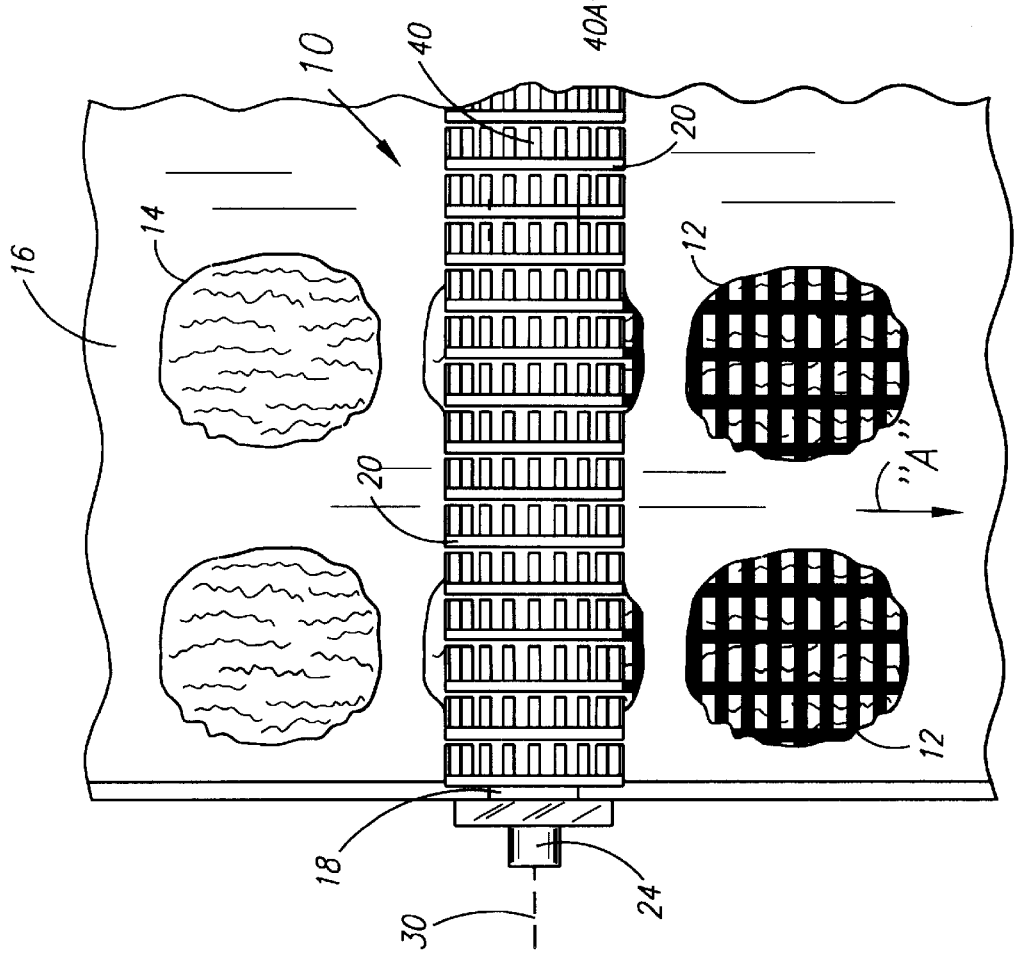
FIG. 2 is a top plan view of the charmarker of FIG. 1.

Referring now to the drawings and initially to FIGS. 1 and 2, there is illustrated an improved charmarker 10 constructed in accordance with a preferred embodiment of the present invention. The charmarker 10 creates a grid pattern of marks 12 on food patties 14 that are passed under the charmarker 10 by a moving food conveyer 16 on which the patties 14 travel, as illustrated in FIG. 2.

Figure 4:
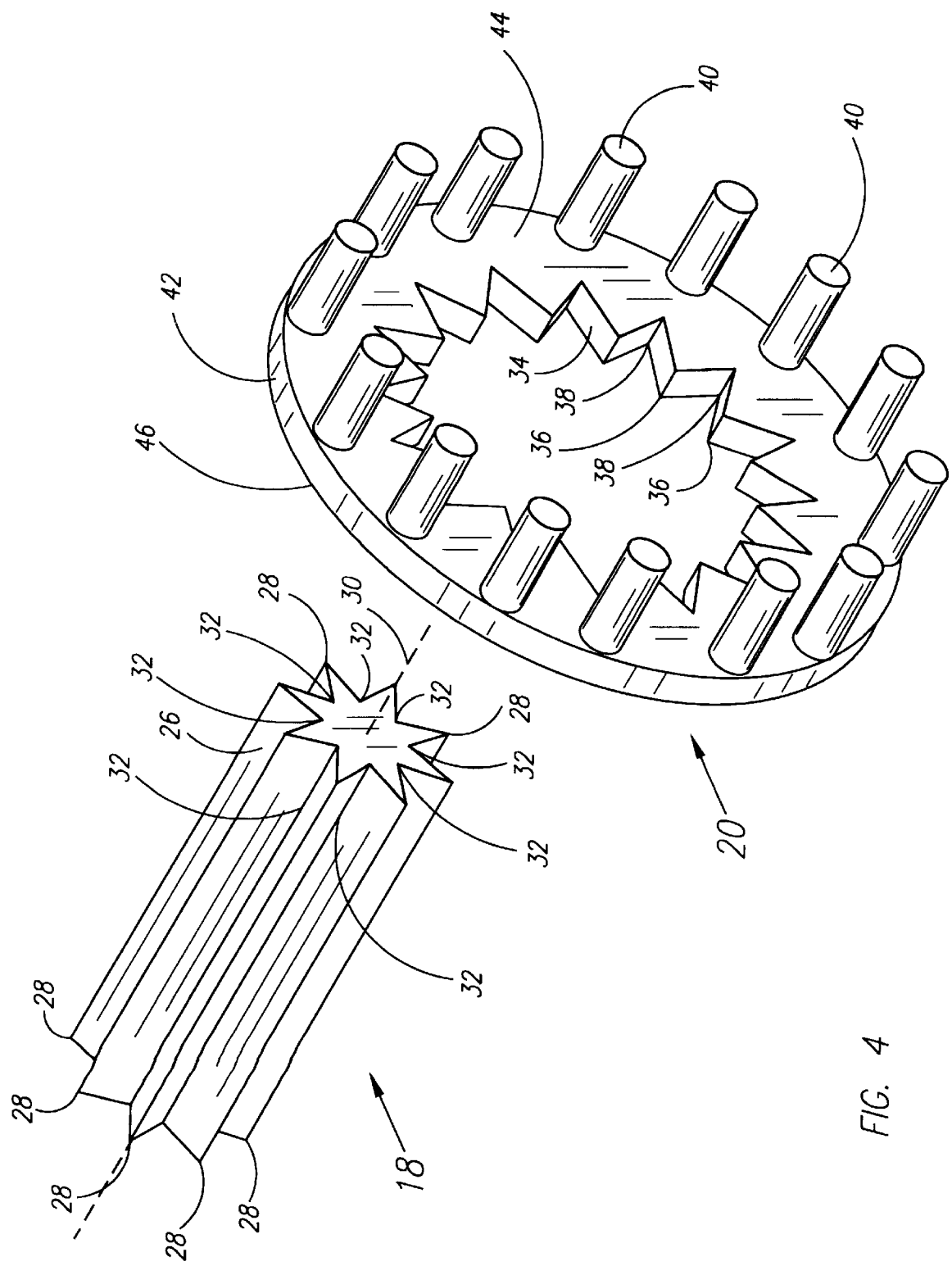
FIG. 4 is an exploded view of the shaft and a ring of the charmarker of FIG. 1.
Figure 5:
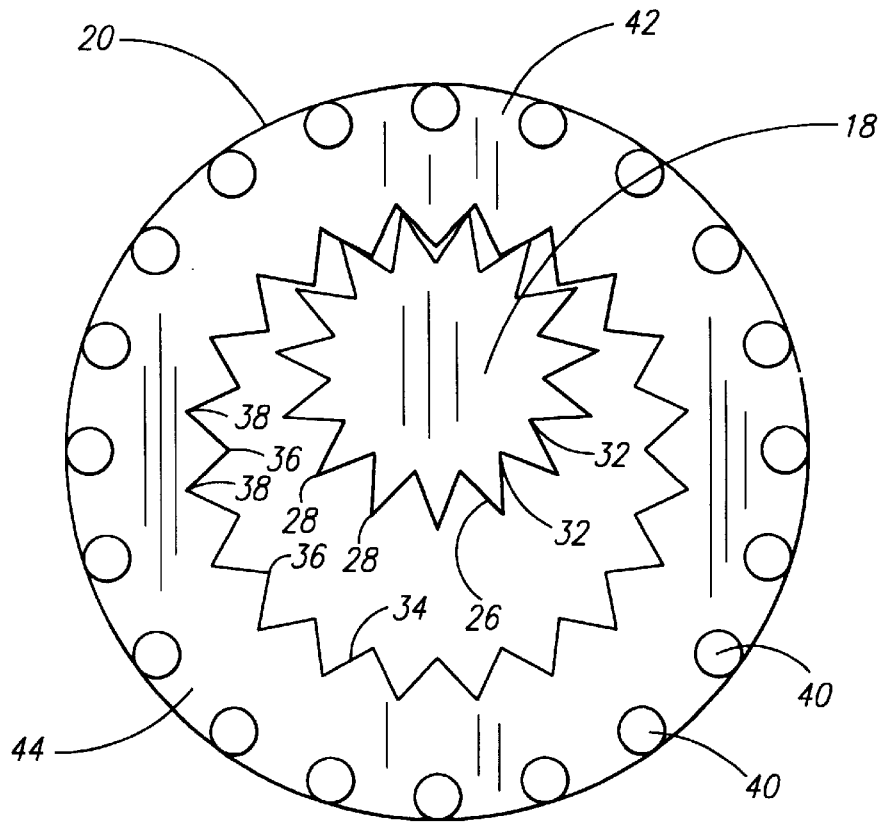
FIG. 5 is a side elevation of the shaft and ring of FIG. 4, showing the ring engaging the shaft.
Figure 6:
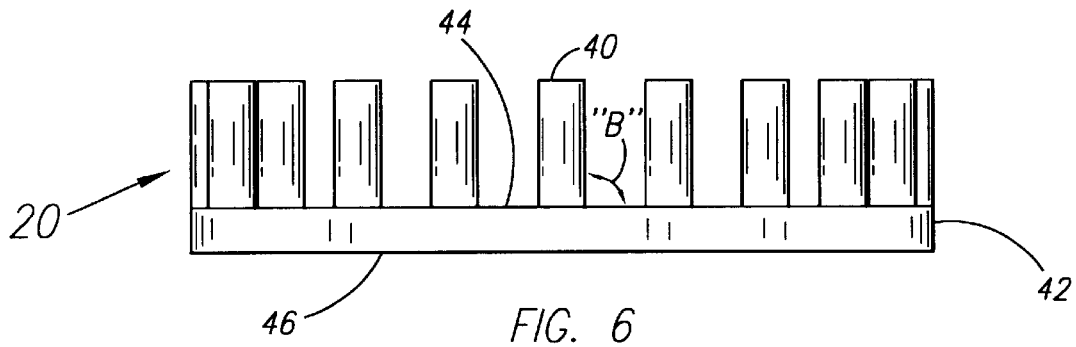
FIG. 6 is a front elevation of the ring of FIG. 5.

Referring now also to FIGS. 4, 5 and 6, the charmarker 10 consists of a specially designed shaft 18 and specially designed char marking rings 20.

The shaft 18 is a long, generally cylindrical member, provided with opposite ends 22 and 24. The ends 22 and 24 of the shaft 18 are supported to hold the shaft 18 horizontally above the food conveyor 16. The shaft 18 is rotated by motorized means (not illustrated) that attaches to one end 22 or 24 of the shaft 18 so that the shaft 18 rotates in conjunction with linear movement of the conveyer 16. Arrow "A" indicates the linear movement of the conveyer 16.

An external surface 26 of the shaft 18 is provided with outwardly extending, longitudinally oriented pointed ridges 28. Each of the ridges 28 extends between the two ends 22 and 24 of the shaft 18, and runs parallel to a longitudinal axis 30 of the shaft 18. A "V"-shaped valley 32 is provided between each adjacent pointed ridge 28 so that when the shaft 18 is viewed in cross section, as illustrated in FIG. 5, the shaft 18 is seen to be generally circular, but is provided with a plurality of evenly spaced apart, pointed ridges 28 extending outward, with a "V"-shaped valley 32 between adjacent pairs of ridges 28.

The char marking rings 20 of the present charmarker 10 differ from prior art char marking rings in two significant ways. First, the char marking rings 20 of the present invention are provided with an interior opening surface 34 that contains spaced-apart, inwardly oriented pointed teeth 36 and "V"-shaped grooves 38 separating adjacent teeth 36. The purpose of the teeth 36 is to engage the "V"-shaped valleys 32 of the rotating shaft 18 and thereby keep all of the rings 20 synchronized in their rotation.

Second, each of the rings 20 is provided with spaced-apart, cross marking members 40 that are located at the periphery 42 of the ring 20 and that extend outward on a first side 44 of the ring 20 toward the periphery 42 and an opposite second side 46 of the next adjacent ring 20. Each of the cross marking members 40 is approximately parallel to each of the other cross marking members 40 provided on the same ring 20.

The cross marking members 40 that extend outward from the ring 20 on the first side 44 of the ring 20 serve two purposes. The first and the primary purpose served by the cross marking members 40 is to mark the food patties 14 in a grid pattern of mark 12 as the food patties 14 pass under the rings 20 on the conveyer 16.

The other purpose served by the cross marking members 40 is incidental to the primary purpose. The second purpose of the cross marking members 40 is to space the rings 20 apart from each other, making in unnecessary to provide additional spacers on either the shaft 18 or the rings 20.

Each cross marking member 40 is associated with one of the teeth 36 on the ring 20 so that when the teeth 36 of the rings 20 engage a single "V"-shaped valley 32, as is the case when the rings 20 are hanging on the shaft 18, the cross marking members 40 of the rings 20 are aligned so that a regular grid pattern of mark 12 will be created on any food patties 14 that pass under the rings 20. The ridges 28 provided on the shaft 18 and the teeth 36 provided on the rings 20 are of sufficient height, and the "V"-shaped valleys 32 and "V"-shaped grooves 38 are of sufficient depth, that the rings 20 are generally not lifted off of the shaft 18 a sufficient distance when the rings 20 roll over patties 14 in order to allow the uppermost tooth 36 of each of the rings 20 to pass over a ridge 28 of the shaft 18 and to enter a new valley 32.

If, on the other hand, a ring 20 were to move upward a sufficient distance so that it entered a new valley 32, the uppermost tooth 36 on the ring 20 would immediately be realigned in it's new valley 32 under the force of gravity and the ring 20 would again be properly aligned relative to the other rings 20 so that a proper grid pattern of mark 12 would be reestablished.

There are fewer ridges 28 and "V"-shaped valleys 32 provided on the shaft 18 than there are teeth 36 and "V"-shaped grooves 38 provided on each of the rings 20. This is because the shaft 18 is smaller in diameter than the interior opening surface 34 of each of the rings 20, and the ridges 28 and "V"-shaped valleys 32 are approximately the same size as the teeth 36 and "V"-shaped grooves 38. It is important that the and the ridges 28 and "V"-shaped valleys 32 and the teeth 36 and "V"-shaped grooves 38 are approximately the same size so that they engage each other like gears as the rings 20 hang on the shaft 18, as illustrated in FIGS. 1 and 5. The rings 20 hang from the smaller diameter shaft and assert only the weight of each individual ring 20 upon the patties 14 passing under the rings 20 on the continuous conveyer 16 located below.

The cooperation of the teeth 36 and valleys 32, and the associated cooperation of the ridges 28 and the grooves 38, force the rings 20 to rotate in conjunction with the shaft 18 and to remain synchronized with each other. The shaft 18 rotates at a speed that is coordinated with the linear movement of the conveyer 16. The shaft 18 rotates at a speed so that the peripheries 42 of the rings 20 travel at approximately the same speed as the linear travel of the conveyor 16. This allows the rings 20 to rotate over the patties 14 at the same speed that the conveyer 16 moves the patties 14 under the rings 20. As illustrated in FIG. 2, the square grid pattern of mark 12 produced by the charmarker 10 has been produced on the patties 14 because the cross marking members 40 of the charmarker 10 are oriented at approximately right angles "B" to the each of the rings 20. This is best illustrated in FIG. 6.

Figure 3:
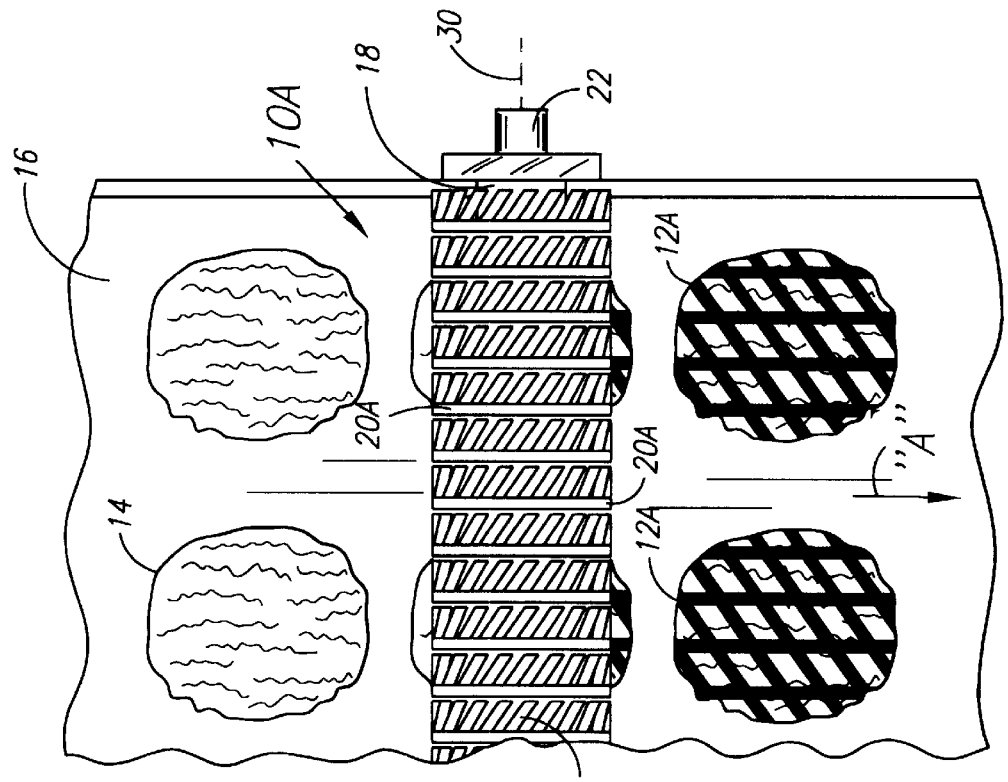
FIG. 3 is a top plan view of an alternate embodiment charmarker.
Figure 7:
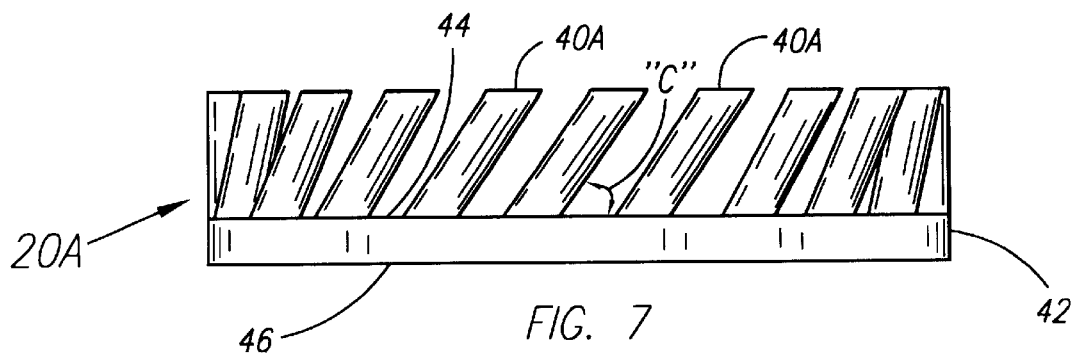
FIG. 7 is a front elevation of the alternate ring of the alternate embodiment charmarker of FIG. 3.

An alternate embodiment charmarker 10A is illustrated in FIG. 3. The alternate charmarker 10A employs alternate char marking rings 20A in conjunction with the shaft 18 to produce an alternate grid pattern of marks 12A that is diamond-shaped as opposed to the box shaped or square grid pattern of marks 12 that is produced by the charmarker 10. The alternate char marking rings 20A differ from the char marking rings 20 only in the angle of orientation of the alternate cross marking members 40A relative to the rings 20. As illustrated in FIG. 7, the alternate cross marking members 40A are oriented at an acute angle "C" relative to each of the rings 20.

Although the invention has been described in terms of rings 20 or 20A having straight cross marking members 40 or 40A attached to the rings 20 or 20A, the invention is not so limited. The invention includes any type of cross marking members 40, 40A, etc. attached to the rings 20, 20A, etc. in order to create complex grid patterns of mark 12, 12A, etc. on patties 14. Also, although the invention has been described for use in marking of patties 14, it is not so limited, and may be employed with a variety of other types of foods.

While the invention has been described with a certain degree of particularity, it is manifest that many changes may be made in the details of construction and the arrangement of components without departing from the spirit and scope of this disclosure. It is understood that the invention is not limited to the embodiments set forth herein for the purposes of exemplification, but is to be limited only by the scope of the attached claim or claims, including the full range of equivalency to which each element thereof is entitled.

What is claimed is:

1. A charmarker for creating complex grid patterns of marks on foods comprising a rotating shaft supported horizontally above a moving food conveyer, means for engaging interior opening surfaces of char marking rings being provided on said shaft, heated char marking rings rotatably hanging on said shaft along the entire length of the shaft, an interior opening surface of each said char marking ring being provided with means for engaging said shaft, and spaced apart cross marking members provided on said char marking rings at the periphery of said rings so that both the cross marking members and the periphery of said rings roll over food located on said conveyer.

2. A charmarker according to claim 1 wherein said means for engaging interior opening surfaces of char marking rings provided on said shaft further comprise parallel ridges provided on an external surface of said shaft and extending between two opposite ends of said shaft, a "V"-shaped valley provided on said shaft between each adjacent pair of ridges.

3. A charmarker according to claim 2 wherein said means for engaging said shaft provided on interior opening surfaces of each said char marking ring further comprise teeth provided on said interior opening surfaces of each said char marking ring and a "V"-shaped groove provided between each adjacent pair of teeth.

4. A charmarker according to claim 3 wherein the teeth of each of said rings engage the "V"-shaped valleys of said shaft, and the "V"-shaped grooves of each said rings engage the ridges of said shaft as a means for keeping the rings synchronized in their rotation.

5. A charmarker according to claim 4 wherein said cross marking members are parallel with each other on each said ring.

6. A charmarker for creating complex grid patterns of marks on foods comprising a rotating shaft supported above a moving food conveyer, ridges provided on an external surface of said shaft so that each ridge extends between two opposite ends of said shaft, a valley provided said shaft between each adjacent pair of ridges, heated char marking rings rotatably hanging on said shaft along its entire length, each said char marking ring being provided with teeth for engaging the valleys of said shaft and provided with a groove between each adjacent pair of teeth for engaging said ridges of said shaft as a means for keeping the rings synchronized in their rotation on the shaft, and spaced apart cross marking members provided on said char marking rings at the periphery of said rings.

7. A charmarker according to claim 6 wherein said cross marking members are parallel with each other on each said ring.

* * * * *